June 17, 1947.  J. P. JAKOB  2,422,198
CONVEYER FOR FISH CANNING MACHINES
Filed July 11, 1945
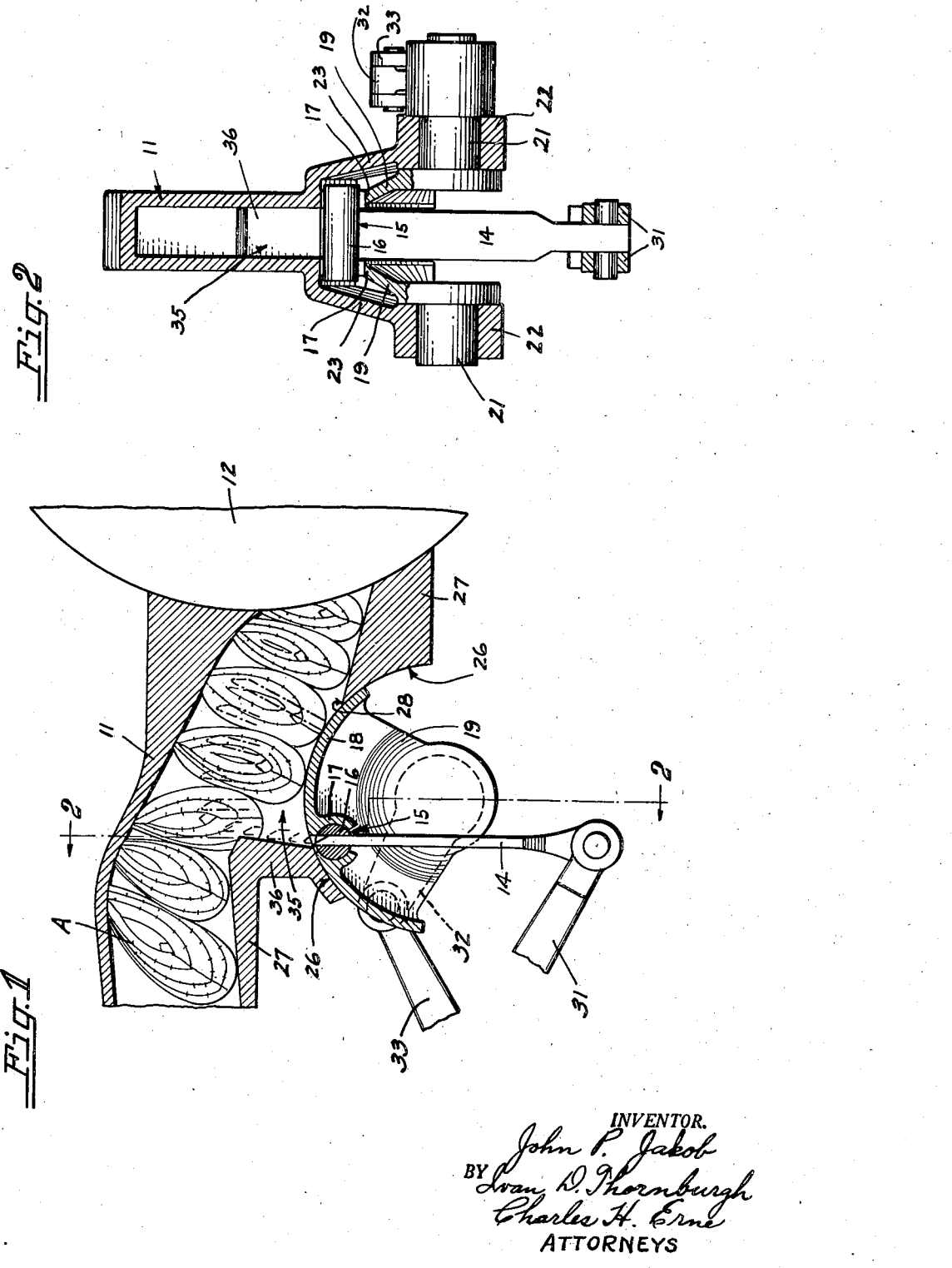
INVENTOR.
John P. Jakob
BY Ivan D. Thornburgh
Charles H. Erne
ATTORNEYS Patented June 17, 1947

2,422,198

UNITED STATES PATENT OFFICE 2,422,198

CONVEYER FOR FISH CANNING MACHINES

John P. Jakob, Roselle, N. J., assignor to American Can Company, New York, N. Y., a corporation of New Jersey Application July 11, 1945, Serial No. 604,434

5 Claims. (Cl. 198—221)

The present invention relates to a fish canning machine of the type having a supply tunnel in which pre-cut individual pieces of fish are collected preparatory to segregating can quantities and has particular reference to an improved tunnel mechanism for advancing the cut fish through the tunnel.

An object of the invention is the provision in a fish canning machine of a supply tunnel mechanism wherein pre-cut pieces of fish are advanced through the tunnel rapidly and gently, with the least disturbance to the fish pieces, in order to produce first grade packing at high speed rates of production.

Another object is the provision of such a supply tunnel mechanism wherein the individual pieces of fish to be advanced are engaged from behind the pieces so that spearing or other injurious contact with the fish resulting in undesirable breaking up of the fish pieces, is prevented.

Numerous other objects and advantages of the invention will be apparent as it is better understood from the following description, which, taken in connection with the accompanying drawings, discloses a preferred embodiment thereof.

Referring to the drawings:

Figure 1 is a horizontal sectional view of a portion of a fish canning machine embodying the instant invention, with parts broken away; and Fig. 2 is a transverse section taken substantially along the broken line 2—2 in Fig. 1.

As a preferred embodiment of the invention the drawings illustrate an improved supply tunnel mechanism for advancing pre-cut pieces of fish A in the process of canning, through a supply tunnel 11 of a fish canning machine of the type disclosed in United States Patent 2,044,813, issued June 23, 1936, to W. E. Rooney on Fish canning machine.

The supply tunnel 11 in general is a fully enclosed tubular member of rectangular cross section and of a width sufficient to accommodate one fish piece. The fish pieces A are introduced individually into this tunnel in any suitable manner, such as that disclosed in the above mentioned Rooney patent, to produce a uniform continuous fish mass which serves as the supply from which the fish is taken in measured charges by a measuring and canning mechanism 12 for packing into cans.

The fish mass in the tunnel 11 is intermittently advanced therethrough toward the measuring mechanism 12 by a feeding device which includes a movable solid blade or paddle 14 of a width which is slightly less than the width of the tunnel 11. This paddle operates in a slot 15 of a short rocker pin or member 16 mounted in a bearing 17 formed in and located adjacent the outer periphery of a curved outer wall section 18 of an oscillatory tumbler 19.

The tumbler 19 is formed with a pair of trunnions 21 carried in bearings 22 in a pair of support legs 23 which extend out from the tunnel side walls. This tumbler is disposed adjacent the supply tunnel 11 with its outer curved wall section 18 slidably engaging against a curved seat 26 formed in a side wall 27 of the tunnel and surrounding an opening 28 therein. The tumbler seals the opening against the escape of the fish pieces therethrough.

The non-feeding position of the paddle 14 relative to the tumbler 19 is shown in Fig. 1, the paddle being fully retracted within the tumbler with its inner end adjacent the outer periphery of the curved wall of the tumbler. Briefly, in advancing the fish mass through the tunnel, the paddle is projected into the tunnel through its side wall opening 28. For this purpose the outer end of the paddle is connected to a link or lever 31 which is actuated in any suitable manner in time with the other moving parts of the machine, preferably as disclosed in the above mentioned Rooney patent. The paddle is thus brought into engagement with the fish mass.

This projection of the paddle 14 into the tunnel 11 is immediately followed by an oscillation of the tumbler 19 through a forward or feeding stroke with the result that the engaged fish pieces are pushed forward. At the termination of this feeding stroke the paddle is withdrawn from the tunnel to its non-feeding position and the tumbler then moves back through a return stroke in readiness for another cycle of operation.

Oscillation of the tumbler 19 is effected preferably by way of a lever arm 32 which is mounted on one of the tumbler trunnions 21. This lever arm is actuated in any suitable maner in time with the other moving parts of the machine, preferably by way of a link 33 as disclosed in the aforesaid Rooney patent.

In advancing the fish mass through the tunnel it is desirable for best results to engage individual fish pieces from behind without spearing or otherwise injuring or breaking them. For this purpose the tunnel 11 is formed in such a manner as to provide an offset pocket or recess 35 which is bridged by the fish pieces as they move through the tunnel so as to leave a clearance space in the tunnel for insertion of the paddle 14 between adjacent fish pieces therein.

The recess 35 is disposed adjacent the tumbler 19 and is set off by a short offset lateral wall section 36 which extends outwardly from the tunnel side wall 27 at an angle thereto at the rear edge of the opening 28 (at the left of the opening as viewed in Fig. 1). The inner surface of this lateral wall section 36 is disposed closely adjacent the path of travel of the inner end of the paddle 14 as the latter moves into the tunnel. This path of travel is indicated by dot and dash outlines of the paddle in the tunnel.

Hence as a fish piece A in the tunnel 11 comes abreast the recess 35, it more or less extends into the recess adjacent the lateral wall section 36. Thus when the paddle 14 is projected into the tunnel for a feeding operation, its inner end travels along in slidable engagement with the lateral wall section 36 of the tunnel and moves into position between the wall section and the adjacent fish piece and thereby engages the fish from behind without spearing or otherwise damaging the fish. In this position, the paddle with its broad solid blade readily pushes forward the engaged fish piece and the others ahead of it, with the rocking of the tumbler 19 through a forward stroke. It is in this manner that the fish pieces are advanced through the tunnel to the measuring mechanism 12 for packing into cans without in any way injuring the fish.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. In a fish canning machine, the combination of a supply tunnel for fish storage, said tunnel having a recess defined at one end by an offset fish confining wall section of the tunnel to provide a clearance space adjacent the fish in the tunnel, and a paddle insertable through said recess in slidable engagement with said offset tunnel wall section into said tunnel for engaging behind individual pieces of fish therein to advance them through the tunnel.

2. In a fish canning machine, the combination of a supply tunnel for fish storage, said tunnel having a laterally extending wall section setting off an adjacent recess communicating with said tunnel to provide an offset clearance space adjacent the fish in the tunnel, and a paddle movable through said recess close to the inner surface of said laterally extending wall section for engaging behind individual fish pieces in said tunnel, said paddle being insertable into the tunnel for advancing the engaged fish pieces through the tunnel.

3. In a fish canning machine, the combination of a supply tunnel for fish storage, said tunnel having an offset recess in a fish confining wall section thereof to provide a clearance space adjacent the fish in the tunnel, and a substantially solid paddle having a width slightly less than the width of said tunnel and insertable through said offset recess and thence into said tunnel for engaging behind individual pieces of fish therein to advance them through the tunnel.

4. In a fish canning machine, the combination of a supply tunnel for fish storage, said tunnel having an opening in a fish confining wall section thereof and a laterally extending offset recess adjacent said opening to provide a clearance space adjacent the fish in the tunnel, an oscillatable tumbler disposed in said tunnel opening for sealing it against the escape of fish therethrough, a paddle carried in said tumbler, said paddle having a tapered outer extremity, means for projecting said paddle into said recess for engaging its tapered extremity behind individual fish pieces in said tunnel, and means for rocking said tumbler in said tunnel opening while the paddle is in the tunnel for advancing the engaged fish through said tunnel.

5. In a fish canning machine, the combination of a supply tunnel for fish storage, said tunnel having an offset wall defining a clearance recess therein and an arcuate seat formed adjacent said recess, an oscillatable tumbler disposed in said seat, means for actuating said tumbler through a forward movement and thence through a return movement in its seat, a rocker member in said tumbler, a paddle slidably mounted in said rocker member and normally housed within said tumbler, and means operable in time with the movement of said tumbler for projecting said paddle beyond said tumbler and into said offset recess of the tunnel in sliding engagement with said offset wall while the tumbler is at rest, said paddle when in projected position engaging behind the fish in the tunnel prior to projection of the tumbler, said paddle serving to push the fish through the tunnel when the tumbler is actuated for a forward movement, said paddle projecting means thereafter withdrawing said paddle rapidly to a position within the tumbler at the end of said forward movement so as to clear the fish in the tunnel on the return movement of said tumbler.

JOHN P. JAKOB.

REFERENCES CITED

The following references are of record in the file of this patent:

UNITED STATES PATENTS

| Number | Name | Date |
|---|---|---|
| 2,189,831 | Paynter et al. | Feb. 13, 1940 |